United States Patent [19]

Viaud et al.

[11] 4,292,130
[45] Sep. 29, 1981

[54] REMOTELY ASSEMBLABLE AND DISASSEMBLABLE FUEL ASSEMBLY FOR NUCLEAR REACTORS

[76] Inventors: Jean-Luc Viaud, PA.5, 72 Les Jardins de Bures, 91440 Bures-sur-Yvette; Jacques Lévy, 4, rue Maria Deraisnes, 75017 Paris, both of France

[21] Appl. No.: 18,222

[22] Filed: Mar. 7, 1979

[51] Int. Cl.³ .............................................. G21C 19/20
[52] U.S. Cl. ...................................... 176/30; 176/78; 414/146; 294/86 A
[58] Field of Search .................. 176/30, 78, 76, 79, 176/87; 414/146; 294/86 A

[56] References Cited

U.S. PATENT DOCUMENTS

| | | | |
|---|---|---|---|
| 3,992,259 | 11/1976 | Anthony | 176/78 |
| 4,036,692 | 7/1977 | Walton | 176/78 |
| 4,045,287 | 8/1977 | Santen | 176/78 |
| 4,064,004 | 12/1977 | Long | 176/78 |

*Primary Examiner*—Donald P. Walsh

[57] ABSTRACT

Remotely assemblable and disassemblable fuel assembly comprising a mechanical structure constituted by an upper plate, a lower plate and a plurality of brace rods extending between the said plates, and a plurality of elongated fuel elements fixed to the brace rods by gratings, one of the ends of each brace rod being irremovably fixed in the upper plate, the other end of each brace rod being fixed to the lower plate by a system of remotely assemblable and disassemblable assemblies, wherein the said system of assemblies comprises a thread made at the end of each brace rod, a screwing member having a thread able to cooperate with the thread on the brace rod and a head having a plug hole and on its periphery at least one chamfer, as well as machining in the lower plate, constituted by a bore having a larger diameter portion issuing into the outer face of said plate, said larger diameter portion being surrounded by a flange shaped by cutting in the plate and which is separated from the remainder of the plate by an annular groove.

Further features are an unscrewing device for the remote disassembly of a fuel assembly, a device for restoring the shape of a fuel assembly flange after said flange has been crimped and a device for crimping the flange of a fuel assembly.

7 Claims, 11 Drawing Figures

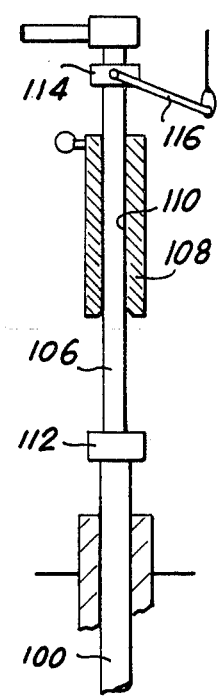
FIG. 8
FIG. 9
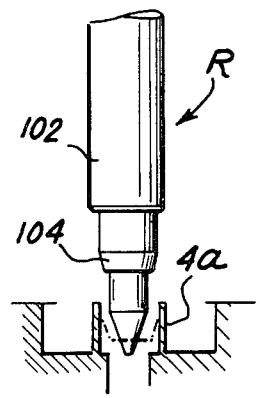
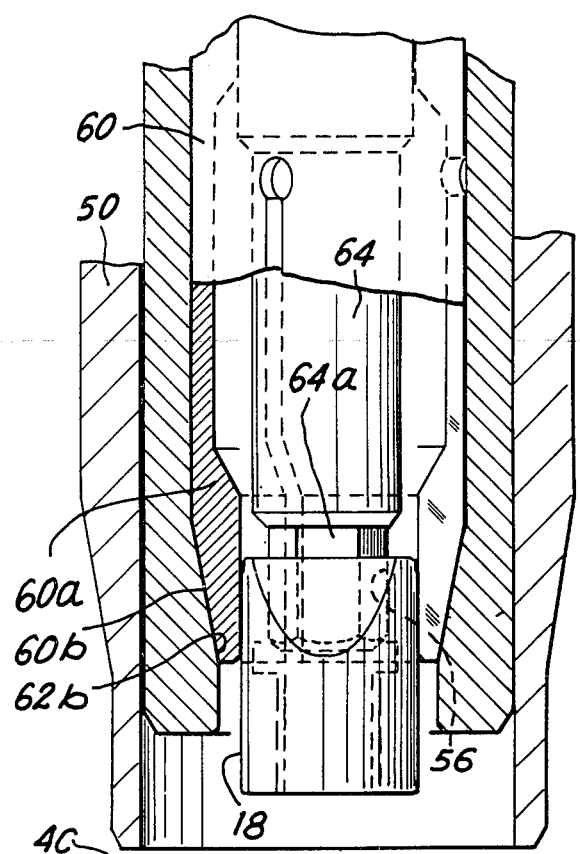
FIG. 6

REMOTELY ASSEMBLABLE AND DISASSEMBLABLE FUEL ASSEMBLY FOR NUCLEAR REACTORS

BACKGROUND OF THE INVENTION

The present invention relates to a remotely assemblable and disassemblable fuel assembly for a nuclear reactor and to the apparatus for performing said assembly and assembly operations for the said fuel assembly.

More specifically, the present invention relates to a fuel assembly for nuclear reactors of the water type, said fuel assembly comprising fuel elements in the form of rods fixed within a rigid structure.

It is known that in pressurized water reactors the reactor core comprises a certain number of juxtaposed fuel assemblies. In known manner, these fuel assemblies comprise mechanical structures permitting the joining of a certain number of fuel elements essentially constituted by fissile material. The present invention relates to the case where the fuel elements comprise fuel rods, i.e. elements whose active part is constituted by a fissile material having an elongated cylindrical shape placed within a protective can made for example from a thin layer of a metal such as zircaloy.

The fuel element can constitutes one of the barriers ensuring the operating safety of the reactor. More specifically, this barrier confines the gases and other fission products resulting from the neutron reaction with respect to the coolant circulating in the reactor vessel and which is constituted by water. It is clear that it is particularly important that this can retain its integrity to obviate the presence of fission products in the cooling water, when the latter leaves the reactor vessel. When an abnormal quantity of fission products is detected in the reactor cooling water, thus indicating an important fracture of the fuel element can, it is necessary to shut down the reactor to change the fuel assembly and replace it by a new fuel assembly.

However, it should be noted that a fuel assembly is very expensive due to the fact that the fuel elements are themselves expensive and due to the fact that the mechanical structure holding the fuel elements in place in the assembly is made from relatively expensive materials. It is therefore obvious that when a single fuel element in an assembly is defective that the greatest interest is attached to the possibility of disassembling the fuel assembly in order to change the defective fuel element. However, it is obvious that this disassembly cannot take place in a normal environment. Disassembly can for example take place in a hot cell ensuring insulation between the personnel carrying out the work and the fuel element, however, this operation is extremely difficult. Another solution consists of removing the fuel assembly from the reactor vessel and placing it in a handling pond in which the fuel element replacement operations are carried out.

It is clear that the second operating procedure offers the double advantage of on the one hand permitting only the replacement of the defective fuel element whilst retaining the remainder of the fuel assembly and on the other of permitting working in a relatively easy manner and in a relatively simple installation constituted by a pond. However, for this operation to be performable it is necessary for the fuel assembly to be constructed in such a way that it can be remotely disassembled.

Systems permitting the remote disassembly of fuel assemblies have already been proposed. This disassembly essentially relates to the removal of one of the end plates of the fuel assembly from the brace rods constituting the remainder of the mechanical structure of the fuel assembly. However, in the hitherto recommended solution, the disassemblable connection between one of the ends of the brace rods and one of the end plates of the fuel assembly has the disadvantage that certain of the assembly member components and more specifically the component which joins the brace rods to one of the end plates in the case of a fracture of the said assembly member become free and can therefore circulate in the reactor vessel and in adjacent installations, thereby impeding the circulation of the cooling liquid and causing material damage, particularly in the heat exchanger tubes. It is obvious that such assembly members are unacceptable.

BRIEF SUMMARY OF THE INVENTION

The present invention relates to a method for assembling one of the end plates of the fuel assembly with the brace rods of said fuel assembly permitting on the one hand the remote disassembly and reassembly of the various parts of the fuel assembly and on the other ensuring that each element of the connecting system cannot be freed even in the case of a fracture of the said connecting system, whilst ensuring a connection which is able to resist all the mechanical stresses to which the fuel assembly is exposed. It is in particular known that fuel assemblies are subject to severe vibrations due to the flow of cooling water in the reactor vessel.

The present invention relates to a remotely assemblable and disassemblable fuel assembly comprising a mechanical structure constituted by an upper plate, a lower plate and a plurality of brace rods extending between the said plates, and a plurality of elongated fuel elements fixed to the brace rods by gratings, one of the ends of each brace rod being irremovably fixed in the upper plate, the other end of each brace rod being fixed to the lower plate by a system of remotely assemblable and disassemblable assemblies, wherein the said system of assemblies comprises a thread made at the end of each brace rod, a screwing member having a thread able to cooperate with the thread on the brace rod and a head having a plug hole and on its periphery at least one chamfer, as well as machining in the lower plate, constituted by a bore having a larger diameter portion issuing into the outer face of said plate, said larger diameter portion being surrounded by a flange shaped by cutting in the plate and which is separated from the remainder of the plate by an annular groove.

The invention also relates to three devices serving on the one hand for the assembly of the fuel assembly and on the other for the remote disassembly thereof.

The unscrewing device for the remote disassembly of the above-defined fuel assembly comprises an outer tube forming the body of the device and terminating in its lower portion by a centering jacket able to penetrate an annular groove of the assembly provided with rotating means; within the said outer tube a control member terminating at its lower end by a sleeve and which is integral in rotation with the outer tube and movable in translation in accordance with the axis thereof, said control member being provided with translating means; within the sleeve of the control member jaws are provided which form a tube within the sleeve, said inner tube being integral in rotation and in translation with the outer tube, said jaws being elastically deformable for gripping the screwing member, whereby the said jaws have externally control ramps able to cooperate with internal control ramps at the lower end of the sleeve of the control member in such a way that the jaws are only locked when the control member is in the raised position; a tool holder shaped like a spindle which is movable in translation with respect to the tube of the jaws, said spindle having at its lower end a tool which is able to cooperate with the plug hole of the screwing member and a reference rod member fixed to its upper end traversing the control member by an axial bore and projecting at the upper end of said member, the tool holder being drawn downwards by an elastic system interposed between the tool holder and the bottom of the sleeve of the control member.

The device for restoring the shape of the assembly flange after crimping the flange comprises a handling pole and at the lower end of said pole a shape restoring tool which consists of a conical mandrel and a member for centering with respect to the flange, the pole constituting over part of its height a translation guide for a weight which is able to slide along the guide, said portion constituting a guide being provided with a lower abutment and a mechanism for raising the weight.

The device for crimping the flange after the fitting of the screwing member comprises a handling pole and at the lower end of said pole a crimping tool having a centering member which is able to penetrate the blind hole of the screwing member, at least one inclined bearing surface which is able to locally deform the flange to apply it to the said chamfer or chamfers of the screwing member and positioning means for making the said bearing surface or surfaces coincide with the said chamfer or chamfers, the pole constituting over part of its height a translation guide for a weight able to slide along the same guide, the portion constituting the guide being provided with a lower abutment and an upper abutment thus defining the height of fall and precisely the useful energy.

BRIEF DESCRIPTION OF THE DRAWINGS

The invention will be described in greater detail hereinafter relative to non-limitative embodiments and the attached drawings, wherein:

FIG. 6 is a detail of the lower end of the unscrewing tool.

FIG. 8 is an elevation of the pole used for the crimping tool and the tool for restoring the shape of the flange.

FIG. 9 shows the lower end of the tool for restoring the shape of the flange in the case of a fixing screw.

DETAILED DESCRIPTION OF THE PREFERRED EMBODIMENTS

Figure 1:
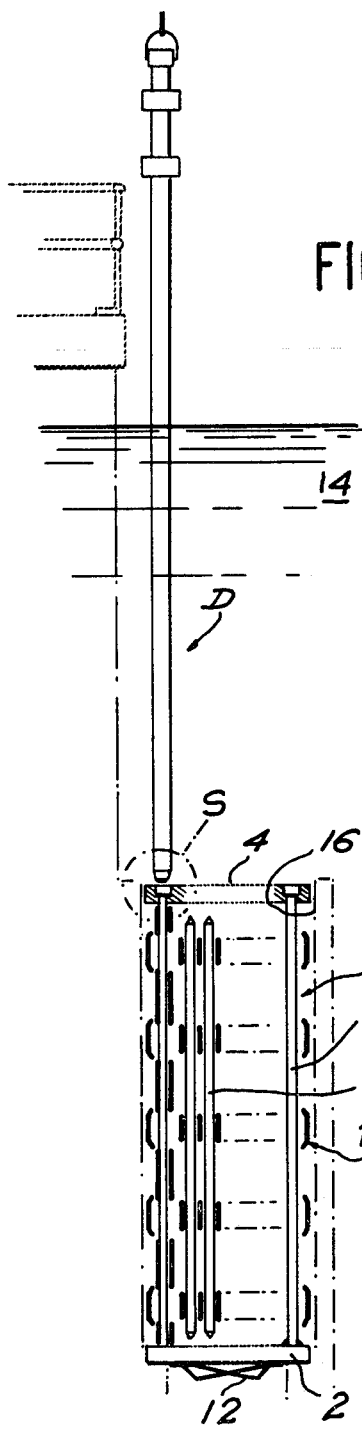
FIG. 1 is an elevation showing a fuel assembly placed in a handling pond and illustrating the fuel assembly system according to the invention.

FIG. 1 shows a fuel assembly according to the invention placed in a handling pond 14. In per se known manner this fuel assembly carrying the general reference A comprises an upper plate 2, a lower plate 4 and brace rods 6, fixed at each of their plate ends to plates 2 and 4. This assembly of parts constitutes the rigid structure of the fuel assembly to which are fixed the actual fuel elements. The fuel elements 8 are fixed to assembly A by means of gratings 10 ensuring the connection between the fuel elements 8 and the brace rods 6. Depending on the type of fuel assembly either the gratings 10 are fixed to the brace rods 6 and the fuel elements 8 are only clipped in the gratings or the gratings 10 are slidingly mounted on the brace rods. Assembly A according to the invention comprises the assembly of these known elements and relates more specifically to the connection S between the lower plate 4 and the lower end of brace rods 6, said connection being such that it can be remotely assembled and disassembled whilst ensuring a very reliable connection. In the assemblies according to the invention, the connection between the upper plate 2 and the upper end of brace rods 6 is ensured by any known non-disassemblable means, such as expansion. According to one of the characteristics of the fuel assembly according to the invention, the disassemblable member S relates to the connection between the brace rods and the lower plate 4. Thus, the upper plate 2 is inter alia provided with elastic strips such as 12 permitting the maintaining in place of the fuel assemblies in the reactor core. Thus, in conventional pressurized water reactors the fuel assembly rests by its lower plate 4 on a core supporg grating and the fuel assemblies are maintained in place by an upper grating which cooperates with the elastic strips 12. By placing the brace rod connecting members with one of the plates in the lower plate 4, more space is provided for working on the connecting members.

It is therefore apparent that for carrying out the reassembly or disassembly of the fuel assembly for the purpose of changing a fuel element 8, the first operation consists of the extraction of the fuel assembly from the reactor vessel, the placing of this fuel assembly in the handling pond 14, the return of the said fuel assembly and its installation in a working position 16 in pond 14. In this position, it is possible to use the tools described briefly hereinbefore and in particular the tool D for unscrewing the members fixing the lower plate to the brace rods.

Figure 2B:
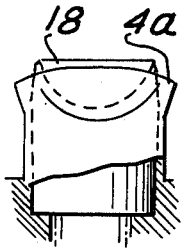
FIGS. 2a, 2b and 2c, are views showing in detail the assembly of a brace rod of the fuel assembly to the lower plate and the deformation of the flange on the screwing member.
Figure 2A:
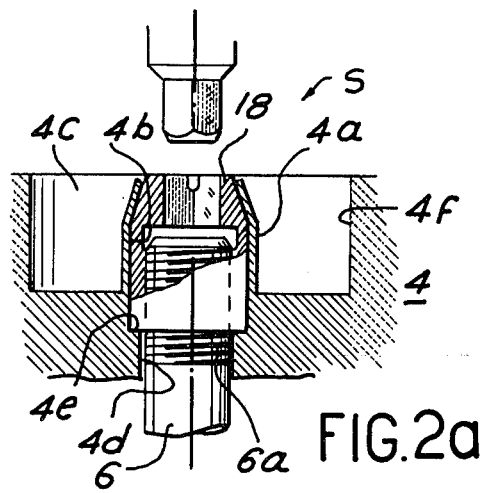
Figure 4:
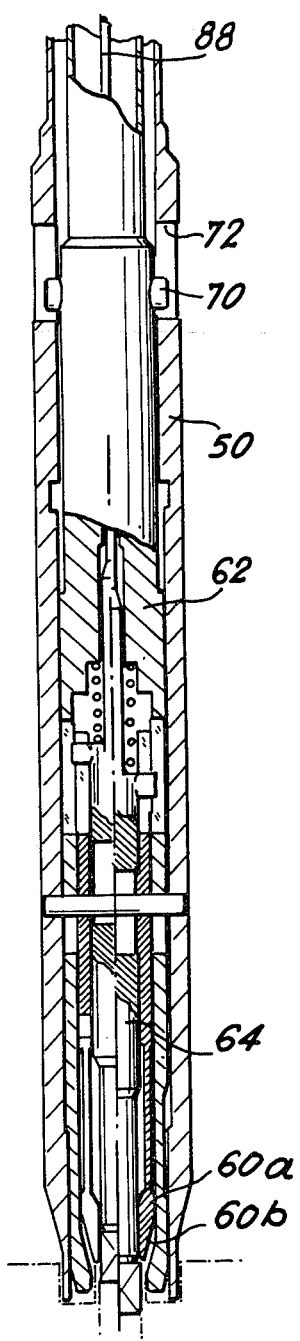
FIGS. 4 and 5 are vertical sectional views of the lower part of the unscrewing tool showing the "screwdriver" and jaws in different positions.

FIG. 2a shows assembly A in greater detail or more precisely the connection S between the lower end of a brace rod 6 and the lower plate 4. In this embodiment, connection is ensured by the cooperation of the threaded portion 6a of brace rod 6 with a nut 18 screwed to the thread portion A. For this purpose, the lower face of the lower plate 4 has special arrangements. It essentially is constituted by a cylindrical flange 4a which is sufficiently slender to be deformed, but sufficiently strong so that it does not break under the action of the deformation process. Flange 4a internally limits a bore 4b able to receive nut 18 and internally an annular positioning groove 4c made in plate 4.

controlled by the position of the end of rod member 88 (half-view from the left of FIG. 4).

Figure 5:
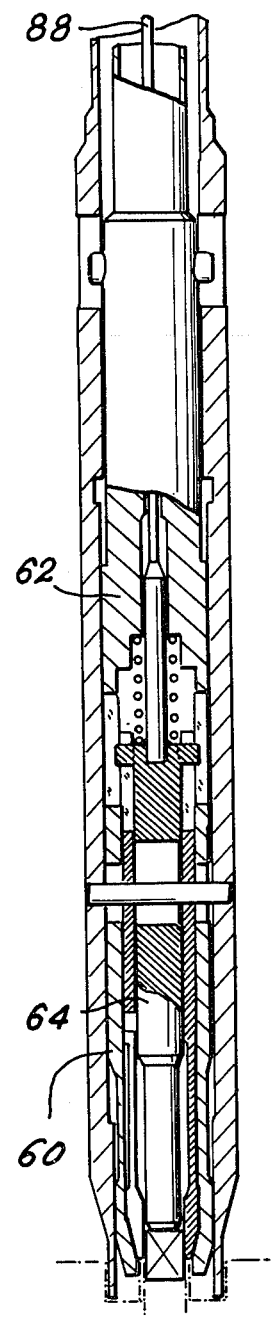

When unscrewing is at an end, the fixing member 54 is seized by jaws 60a for which purpose the control hand wheel 70 is operated so as to bring about the rotation of control member 62 and more specifically the raising thereof. The frustum-shaped ramp 62b acts on jaws 60a by ensuring the locking thereof on the head of screwing member 54 (FIG. 5). Once an adequate locking has been obtained, the assembly of the upper plate to the brace rods is discontinued and the screwing member 54 is taken in charge by tool D. It is then merely necessary to raise the tool assembly for lifting screw 54 and there is no risk of loss (FIG. 6). In order to extract the screwing tool 54 from tool D it is merely necessary to operate the hand wheel 70 to bring about the opening of the jaws 60a. In this situation and under the action of screw 66, screwing member 54 is ejected from the tool. In the case where said ejection does not in fact take place, it is always possible to act on the rod member 88 to effectively obtain said ejection. It is readily apparent that tool D fulfils all the functions devolving upon it, namely its positioning with respect to the screwing member 54 due to groove 4c, the unscrewing of the screwing member 54 which is accompanied by forcing of the braking ensured by the deformation of flange 4a, the seizing of the screwing member 54 after its unscrewing by jaws 60a and the extraction of the vessel from the assembly member without any risk of loss. Moreover, it is clear that tool D is able to accomplish all these operations with a reduced visibility and at a distance corresponding to the height of the water in the pond 14 necessary for providing biological protection relative to assembly A which is irradiated.

A description will now be provided of the tools making it possible on the one hand to bring about the screwing of screwing member 54 and the caulking of flange 4a for the purpose of ensuring the braking of the assembly member and on the other the tool making it possible to bring about the restoring of the shape of flange 4a with a view to refitting the assembly member.

Tool R for restoring the shape of flange 4a comprises an operating pole 100 at whose lower end is fixed the actual tool 102. The actual tool comprises a frustum-shaped mandrel 104 whose lower end is used for the centering of the tool by operating with bore 4d of plate 4. Mandrel 104 is a cone wih a gradient of approximately 10°.

Pole 100 serves not only to remotely guide tool 102, but also to apply a calibrated force thereto which is necessary for bringing about the reshaping of flange 4a. The upper part 106 of the pole serves as a translation guide for the calibrated weight 108. Weight 108 is provided with a central bore 110 which cooperates with guide 106. An abutment 112 dowwwardly limits the travel of the weight, whilst an upper abutment 114 associated with the lifting member 116 makes it possible to ensure the reproducibility of the load applied.

Figures 10, 11:
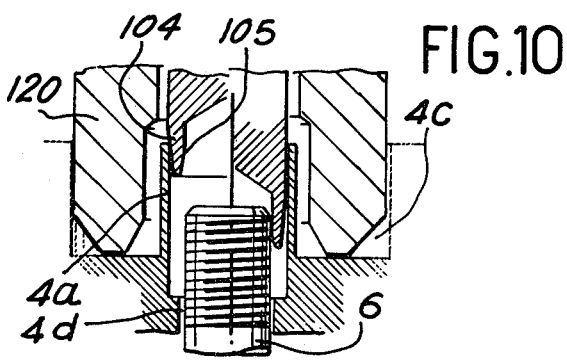
FIG. 10 shows the lower end of the tool for restoring the shape of the flange in the case of a fixing nut.
FIG. 11 shows the lower end of the flange crimping tool on the nut or screw head.

Depending on the material from which the flange is made, the weight is dropped a larger or smaller number of times. A handle 118 makes it possible to turn the tool assembly, which corresponds to the case when the screwing member is screw 54. In the case where said member is a nut, it is necessary to change the shape of the tool, as shown in FIG. 10. As the bore 4d is occupied by the upper threaded end of the brace rod it can no longer serve for the centering of the tool. This centering can be obtained by a cylindrical skirt 120 which cooperates with the outer face of groove 4c. The tool still has the frustum-shaped portion 104, but at the top is provided with a blind hole 105 due to the presence of the upper end of the brace rod.

The crimping tool M is fixed to the end of a pole identical to that shown in FIG. 11. The actual tool 130 has a centering end 132 and two ribs 134 which prevent any mistake being made (only one being shown) for cooperating with a corresponding groove 18c on the screwing member. In addition, the tool has an outer skirt 136 whose diameter is greater than that of flange 4a, the skirt being provided with two inclined inner bearing surfaces for ensuring the crimping of flange 4a on the crimping bearing surfaces 18a of nut 18 or screw 54.

The invention is not limited to the embodiments described and represented hereinbefore and various modifications can be made thereto without passing beyond the scope of the invention.

What is claimed is:

1. A remotely assemblable and disassemblable fuel assembly comprising a mechanical structure constituted by an upper plate, a lower plate and a plurality of brace rods extending between said plates, and a plurality of elongated fuel elements fixed to the brace rods by gratings, one of the ends of each brace rod being irremovably fixed in the upper plate, the other end of each brace rod being fixed to the lower plate by a system of remotely assemblable and disassemblable assemblies, wherein the said system of assemblies comprises a thread made at the end of each brace rod, a screwing member having a thread able to cooperate with the thread on the brace rod and a head having a plug hole and on its periphery at least one chamfer, the lower plate being machined to define a through bore receiving the end of each brace rod, a larger diameter portion of said bore issuing into an outer face of the lower plate and receiving the screwing member and an annular groove surrounding said larger diameter portion and issuing into said outer face, the larger diameter portion of said bore and said annular groove defining a flange integral with the lower plate therebetween, said flange being adapted to be crimped on said chamfer of the screwing member to prevent removal of the latter.

2. A fuel assembly according to claim 1, wherein the screwing member is a nut, the upper end of the brace rod being externally threaded and penetrating the larger diameter portion.

3. A fuel assembly according to claim 1, wherein the screwing member is a screw, the end of the brace rod having a tapped axial hole able to cooperate with the screw thread.

4. An unscrewing device for the remote disassembly of a fuel assembly comprising an upper plate, at least one lower place, a plurality of brace rods extending between said plates and a plurality of elongated fuel elements fixed to the brace rods by gratings, one of the ends of each brace rod being irremovably fixed in the upper plate, the other end of each brace rod being fixed to the lower plate by a system of remotely assemblable and disassemblable assemblies, wherein the said system of assemblies comprises a thread made at the end of each brace rod, a screwing member having a thread able to cooperate with the thread on the brace rod and a head having a plug hole and on its periphery at least one chamfer, the lower plate being machined to define a through bore receiving the end of each brace rod, a larger diameter portion of said bore issuing into an outer Bore 4b is continued in plate 4 by a small diameter bore 4d into which passes the brace rod 6. Bores 4b and 4d are connected by a bearing surface 4e on which bears nut 18 when the latter is screwed.

Figure 2C:
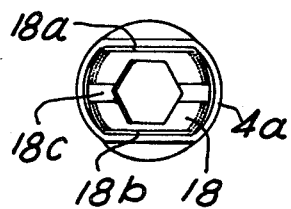
Figure 7:
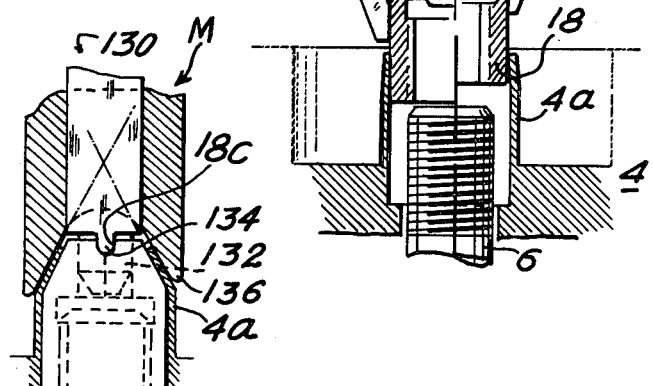
FIG. 7 illustrates in a first position and a second position the extraction of the fixing nut from the lower plate.

As is best seen from FIGS. 2b and 2c, nut 18 has two chamfers 18a and a hollow, for example, hexagonal head 18b. Moreover, the nut has a positioning slot 18c. It is apparent that after screwing nut 18 onto brace rod 6 it is possible to immobilize the nut with respect to the brace rod by deforming part of the flange 4a by caulking so that it engages on the chamfers 18a of nut 18. This is shown in perspective in FIG. 2c. It is readily apparent that flange 4a which forms an integral part of the lower plate 4 if the brace rod 6 breaks, nut 18 and the broken part of said rod 6 are maintained in place by the deformed flange 4a. The nut can be replaced by a screw. In this case, the external thread of the brace rod is replaced by an axial tapped hole at the end of the rod. The threaded portion of the screw cooperates with the tapped hole.

It is apparent from the above description that the various operations for the assembly of the fuel assembly and the disassembly thereof are as follows:

for assembly it is a question of screwing nut 18 onto brace rod 6 and when screwing has taken place to caulk the flange 4a in order to apply a portion of the latter against chamfers 18a, said operation being carried out with the aid of tool M;

for the disassembly of the assembly it is necessary on the one hand to unscrew by force the nut 18 which at the same time ensures the decaulking of flange 4a and on the other to extract nut 18 by gripping the same, this double operation being formed by unscrewing tool D.

Finally, in order to fit a new nut for the purpose of reassembling the fuel assembly it is necessary to reshape flange 4a to permit the fitting of a new nut 18, which is carried out by means of the tool for restoring the shape of the flange R.

As stated hereinbefore, the tool D for unscrewing the screw or the nut fulfils a double function and on the one hand permits the unscrewing of the nut or screw in order to disengage the lower plate and brace rods and on the other it permits, when said unscrewing operation is at an end, to seize the nut or screw head in order to extract it from the disassembly pond. Due to the presence of groove 4c, the tool also makes it possible to position the lower part of tool D with respect to the nut or screw head. Finally, this tool makes it possible to remotely check that the unscrewing of the fixing member is at an end, thereby permitting the extraction of the latter.

Figure 3:
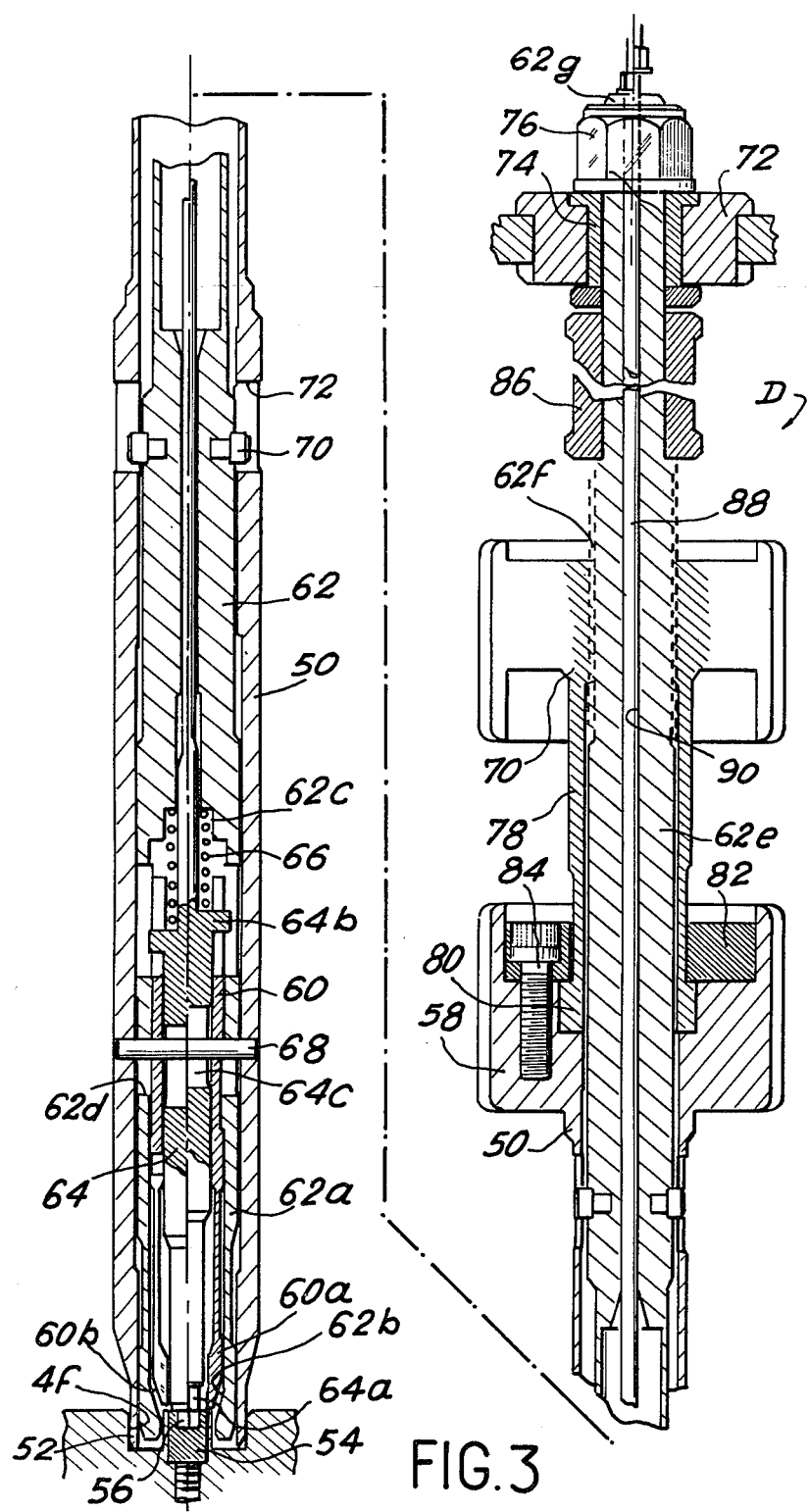
FIG. 3 is a vertical sectional view of the unscrewing tool system.

FIG. 3 shows in simplified manner the assembly of tool D and more specifically the half-view from the left shows the lower portion of the tool with the active members and the half-view from the right the remainder of the tool and its support head.

Tool D has an outer tube 50 which terminates at its lower end with a centering jacket 52 able to cooperate with the outer side wall 4f of groove 4. Thus, the jacket ensures the centering 2 with respect to the assembly member, which, in FIG. 3, is a screw 54 whose head has a groove 56. At its other end, outer tube 50 is fixed to an operating hand wheel 58 permitting the rotation of the tool system, as will be seen hereinafter. Within the outer tube 50, there is an inner tube 60 which terminates by gripping jaws 60a able to seize the assembly member. Tube 60 with its jaws 60a is located within a member 62 for controlling the opening of jaws 60a. For this purpose, mmber 62 is terminated by a tubular portion 62a surrounding the inner tube 60. At the lower end portion 62a of control member 62 has a conical inner ramp 62b able to cooperate with the frustum-shaped outer bearing surface 60d of jaws 60a. It is apparent that when the tubular portion 62a is in the lower position, jaws 60a are expanded, i.e. no gripping is effected, whilst when the tubular portion 62a is in the raised position the frustum-shaped ramp 62d is already applied to jaws 62a and causes the gripping thereof.

Within the inner tube 60 carrying jaws 60a there is a spindle-shaped member 64. The lower end of member 64 which is indicated by the reference numeral 64a constitutes an unscrewing tool which is able to cooperate with the groove 56 of screw 54. Spindle 64 whih carries the unscrewing tool 64a can move freely with respect to the inner tube 60 and the control member 62 of the jaws. More specifically, spindle 64 has a head 64b and a helical spring 66 is placed between head 64b and a bearing surface 62c of member 62. Spring 66 serves to remove the spindle 64 from jaws 60a. A transverse key 68 ensures the connection in rotation of spindle 64 of inner tube 60, of tubular portions 62a of control member 62 for the jaws and the outer tube 50. However, the tubular portion 62a has openings 62d permitting a limited movement in translation of member 62 with respect to the outer tube 50. In the same way a slot 64c permits a relative displacement in translation of spindle 64 relative to inner tube 60. Rotation inhibiting pins such as 70 connected to member 62 further improve the rotational connection of outer tube 50 and member 62 by cooperating with openings such as 72 provided in inner tube 50.

The upper extension 62e of member 62 has a threaded portion 62f which cooperates with a control hand wheel 70 of member 62. At its upper end, extension 62e traverses a supporting member 72 in which it is mounted in rotary manner. The support is constituted by a bearing 74 integral with member 12 and by the nut 76 screwed to the end 62g of extension 62e. Hand wheel 70 is downwardly extended by a jacket 78 having a shoulder 80. The immobilisation in translation of hand wheel 70 is ensured by a washer 82 screwed by screws 84 in hand wheel 58 which locks the shoulder 80. A sleeve 86 surrounds the upper portion of extension 62e below the support member 72. Moreover, spindle 64 has a rod member 88 which extends it and traverses the extension 62e in its bore 90. The upper end of rod member 88 is free and constitutes a displacement control for the active end 64a of spindle 64.

Tool D is utilized in the following manner. Assembly A to be disassembled is placed in the position shown in FIG. 1 and tool D is fitted with the aid of support member 72. The positioning of the tool is ensured by the cooperation of groove 4c and the positioning jacket 52, whose lower end is chamfered. Tool D is then in abutment against the base of groove 4c (FIG. 3 right-hand portion of the view from the left). On rotating the tool assembly D by means of hand wheel 58 the active end 64a of spindle 64 is made to coincide with the hexagonal pole 56 of screw 54 and end 64a penetrates hole 56 under the action of spring 66 (half-view from the right of FIG. 4). The jaws 60a are spaced apart. By turning the hand wheel 58 in an appropriate direction the unscrewing of screw 54 is brought about. As unscrewing progresses, spring 66 is compressed. Unscrewing is face of the lower plate and receiving the screwing member and an annular groove surrounding said larger diameter portion and issuing into said outer face, the larger diameter portion of said bore and said annular groove defining a flange integral with the lower plate therebetween, said flange being adapted to be crimped on said chamfer of the screwing member to prevent removal of the latter wherein said device comprises an outer tube forming the body of the device and terminating in its lower portion by a centering jacket able to penetrate an annular groove of the assembly provided with rotating means; within the said outer tube a control member terminating at its lower end by a sleeve and which is integral with the outer tube and movable in translation in accordance with the axis thereof, said control member being provided with translating means; means for preventing rotation of the sleeve; jaws provided within the sleeve of the control member jaws and which form a tube within the sleeve, said inner tube being integral in rotation and in translation with the outer tube, said jaws being elastically deformable for gripping the screwing member, whereby the said jaws have external control ramps able to cooperate with internal control ramps at the lower end of the sleeve of the control member in such a way that the jaws are only locked when the control member is in the raised position; a tool holder shaped like a spindle which is movable in translation with respect to the tube of the jaws, said spindle having at its lower end a tool which is able to cooperate with a plug hole in the screwing member and a reference rod member fixed to its upper end traversing the control member by an axial bore and projecting at the upper end of said member, the tool holder being drawn downwards by an elastic system interposed between the tool holder and the bottom of the sleeve of the control member.

5. A device according to claim 4, wherein the control member passes out of the outer tube in the upper portion thereof and is provided at its upper end with means for supporting the said device and wherein the means for the translation of the control member comprise a hand wheel having a tapped bore able to cooperate with an outer thread provided on the portion of the control member which projects beyond th outer tube, said hand wheel being immobilized in translation with respect to the outer tube.

6. A device for restoring the shape of a flange of a fuel assembly following the crimping of said flange, said fuel assembly comprising an upper plate, a lower plate, a plurality of brace rods extending between said plates and a plurality of elongated fuel elements fixed to the brace rods by gratings, one of the ends of each brace rod being irremovably fixed in the upper plate, the other end of each brace rod being fixed to the lower plate by a system of remotely assemblable and disassemblable assemblies, wherein the said system of assemblies comprises a thread made at the end of each brace rod, a screwing member having a thread able to cooperate with the thread on the brace rod and a head having a plug hole and on its periphery at least one chamfer, the lower plate being machined to define a through bore receiving the end of each brace rod, a larger diameter portion of said bore issuing into an outer face of the lower plate and receiving the screwing member and an annular groove surrounding said larger diameter portion and issuing into said outer face, the larger diameter portion of said bore and said annular groove defining a flange integral with the lower plate therebetween, said flange being adapted to be crimped on said chamfer of the screwing member to prevent removal of the latter, wherein said device comprises a handling pole and at the lower end of said pole a shape restoring tool which consists of a conical mandrel and a member for centering with respect to the flange, the pole constituting over part of its height a translation guide for a weight which is able to slide along the guide, said portion constituting a guide being provided with a lower abutment and a mechanism for raising the weight.

7. A device for crimping the flange of a fuel assembly, said fuel assembly comprising an upper plate, a lower plate, a plurality of brace rods extending between said plates and a plurality of elongated fuel elements fixed to the brace rods by gratings, one of the ends of each brace rod being irremovably fixed in the upper plate, the other end of each brace rod being fixed to the lower plate by a system of remotely assemblable and disassemblable assemblies, wherein the said system of assemblies comprises a thread made at the end of each brace rod, a screwing member having a thread able to cooperate with the thread on the brace rod and a head having a plug hole and on its periphery at least one chamfer, the lower plate being machined to define a through bore receiving the end of each brace rod, a larger diameter portion of said bore issuing into an outer face of the lower plate and receiving the screwing member and an annular groove surrounding said larger diameter portion and issuing into said outer face, the larger diameter portion of said bore and said annular groove defining a flange integral with the lower plate therebetween, said flange being adapted to be crimped on said chamfer of the screwing member to prevent removal of the latter wherein said device comprises a handling pole and at the lower end of said pole a crimping tool having a centering member able to penetrate the opening of the screwing member, at least one inclined bearing surface able to locally deform the flange in order to apply it to a chamfer or chamfers of the screwing member and positioning means for making the said bearing surface or surfaces coincide with the chamfer or chamfers, said pole constituting over part of its height a translation guide for a weight which is able to slide along the guide, said portion which constitutes the guide being provided with a lower abutment and a mechanism for raising the weight.

* * * * *

UNITED STATES PATENT AND TRADEMARK OFFICE
CERTIFICATE OF CORRECTION

PATENT NO. : 4292130
DATED : September 29, 1981
INVENTOR(S) : Levy et al

It is certified that error appears in the above-identified patent and that said Letters Patent are hereby corrected as shown below:

Insert in appropriate place in heading of patent following the identification of the inventors:

[73] Assignee : Commissariat A L'Energie Atomique
Paris, France

Signed and Sealed this

Twenty-third Day of March 1982

[SEAL]

Attest:

Attesting Officer

GERALD J. MOSSINGHOFF

Commissioner of Patents and Trademarks